June 18, 1929.  J. T. ZAK  1,717,596
RANGE FINDING INSTRUMENT
Filed Nov. 1, 1928
Fig-1-
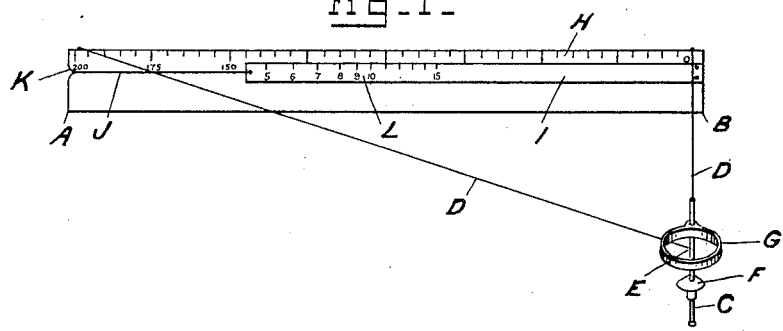
Fig-2-
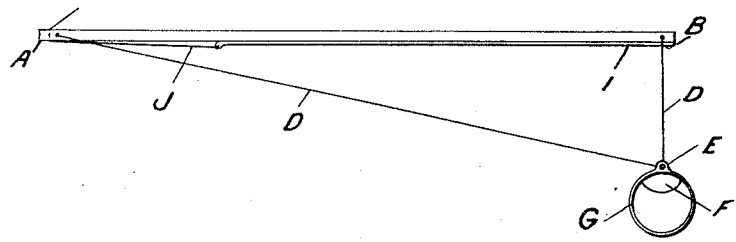
Fig-3-
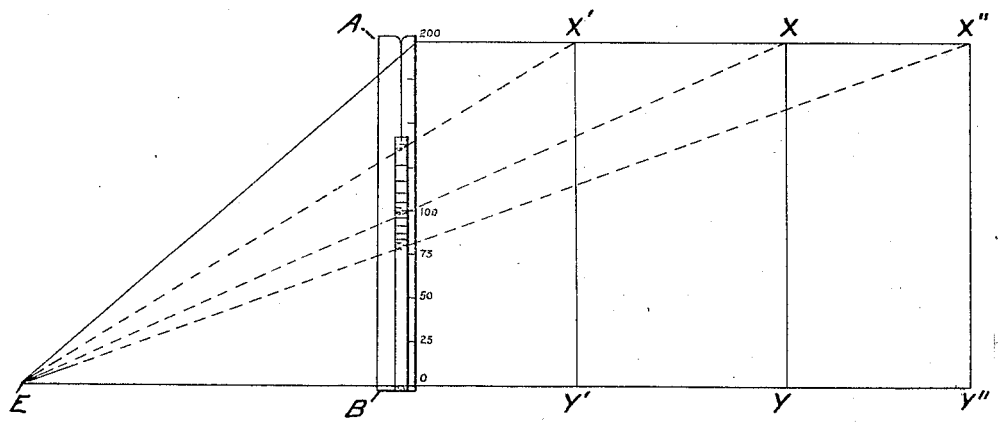
Inventor
Joseph T. Zak
By W. N. Roach
Attorney Patented June 18, 1929.

1,717,596

UNITED STATES PATENT OFFICE.

JOSEPH T. ZAK, OF MILWAUKEE, WISCONSIN.

RANGE-FINDING INSTRUMENT.

Application filed November 1, 1928. Serial No. 316,509.

(GRANTED UNDER THE ACT OF MARCH 3, 1883, AS AMENDED APRIL 30, 1928; 370 O. G. 757.)

The subject of this invention is a range finding instrument.

The purpose of the invention is to provide a range finding instrument which is especially adapted for the condition where the width of the target is known. The instrument is of simple structure, designed to meet the requirements of field service and to be capable of incorporation with devices for determining the range under conditions other than those enumerated.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompaying drawings, wherein Fig. 1 is a view in front elevation of an instrument constructed according to the invention;

Fig. 2 is a plan view thereof and

Fig. 3 is a diagrammatic view illustrating the application of the instrument in solving the range problem.

Referring to the drawings by characters of reference:

The instrument comprises a bar AB which may be held so that the end B is a predetermined distance, in the present case twenty inches from the eye of the observer, by means of an arrangement consisting of a cord or cords DD attached to the bar and secured to a rod C so that the point of attachment E will establish the prescribed distance when the cords are drawn taut. For the purpose of steadying the rod, it carries a slidable mouthpiece F and a headstrap G whereby the rod may be firmly held against the cheek and forehead of the observer.

The bar is inscribed with a mil scale H, zero being at the end B. Below this scale there is placed an elastic band I fixed to the end B of the bar and having a cord J on its free end, whereby it can be extended. The cord is engageable in a notch K in the bar to hold the band in the stretched position. The band is inscribed with a range scale L, based on the formula $$RM = 1000\ W$$

where R is range; M is the angular width of the target in mils and W is the linear width of the target.

For the purpose of adjusting the instrument for operation, the assumption is always made that the range of the target is 1000 yards because at this range 100 mils subtend 100 yards of the target front.

Referring to Fig. 3, let it be known that the target XY is 100 yards wide. The observer extends the rubber band until the 1000 range graduation is alined with the 100 mil graduation. With the point E on the rod C, held directly in front of one eye and the instrument extended towards the target until the cords are taut, the observer sights the end B of the instrument at the right end Y of the target and then notes where the line of sight to the other end X of the target intersects the range scale. In the present instance, the intersection is noted as being 1000 yards and this is the range. If the target is moved to the line X'Y', the range is seen to be 500 yards and if it is moved to the line X"Y", the range is noted as 1500 yards.

If the target is known to be 150 yards in width, the band would be adjusted by extending it until the 1000 yard graduation on the range scale is in line with the 150 mil mark. The readings, in order to determine range, would be taken in the same manner as prescribed for the target which was 100 yards wide.

I claim:

A range finding instrument comprising a support bearing a scale graduated in mils, means for holding the support so that the zero of the mil scale is a predetermined distance from the eye of the observer, an elastic band on the support with one end fixed thereto at the zero of the mil scale, there being a range scale on the band and means for holding the band in extended position along and adjacent the mil scale.

JOSEPH T. ZAK.